United States Patent
Himmel et al.

(10) Patent No.: US 6,987,844 B2
(45) Date of Patent: Jan. 17, 2006

(54) CALLER-INITIATED TRANSFER OF SERVICES BETWEEN TELEPHONES

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 09/942,758

(22) Filed: Aug. 30, 2001

(65) Prior Publication Data

US 2003/0045267 A1    Mar. 6, 2003

(51) Int. Cl.
H04M 15/00 (2006.01)
H04M 11/00 (2006.01)
H04M 3/42 (2006.01)

(52) U.S. Cl. .............................. 455/114.2; 379/201.01; 379/201.02; 379/114.05; 379/120; 455/406; 455/417

(58) Field of Classification Search ........... 379/114.01, 379/114.05, 114.19, 114.2, 201.01, 201.02, 379/201.05, 201.12, 207.11, 212.01, 215.01, 379/211.01, 211.02, 114.17, 114.16, 120; 455/405, 406, 408, 407, 466, 415, 416, 417, 455/414.1

See application file for complete search history.

(56) References Cited

U.S. PATENT DOCUMENTS

| 5,845,207 A | * | 12/1998 | Amin et al. .............. 455/414.1 |
| 6,175,741 B1 | * | 1/2001 | Alperovich ................. 455/458 |
| 6,301,484 B1 | * | 10/2001 | Rogers et al. .............. 455/466 |
| 6,424,706 B1 | * | 7/2002 | Katz et al. ............. 379/144.01 |
| 6,564,047 B1 | * | 5/2003 | Steele et al. ................ 455/405 |
| 2004/0037414 A1 | * | 2/2004 | Pramodkumar et al. ..................... 379/265.01 |

* cited by examiner

*Primary Examiner*—Rexford Barnie
(74) *Attorney, Agent, or Firm*—Duke W. Yee; Mark S. Walker; Peter B. Manzo

(57) ABSTRACT

A method, computer program product, and data processing system for transferring mobile telephone minutes or other mobile telephone services or features from one customer to another is disclosed. A customer dials into an interactive service that allows the customer to specify one or more recipients and a number of minutes, services, or features to transfer. A data processing system associated with the customer's mobile telephone service provider effects a transfer of minutes, services, or features from the customer's account to the recipients' accounts. In addition, a notification that the transfer has occurred can be sent to the recipients.

33 Claims, 5 Drawing Sheets

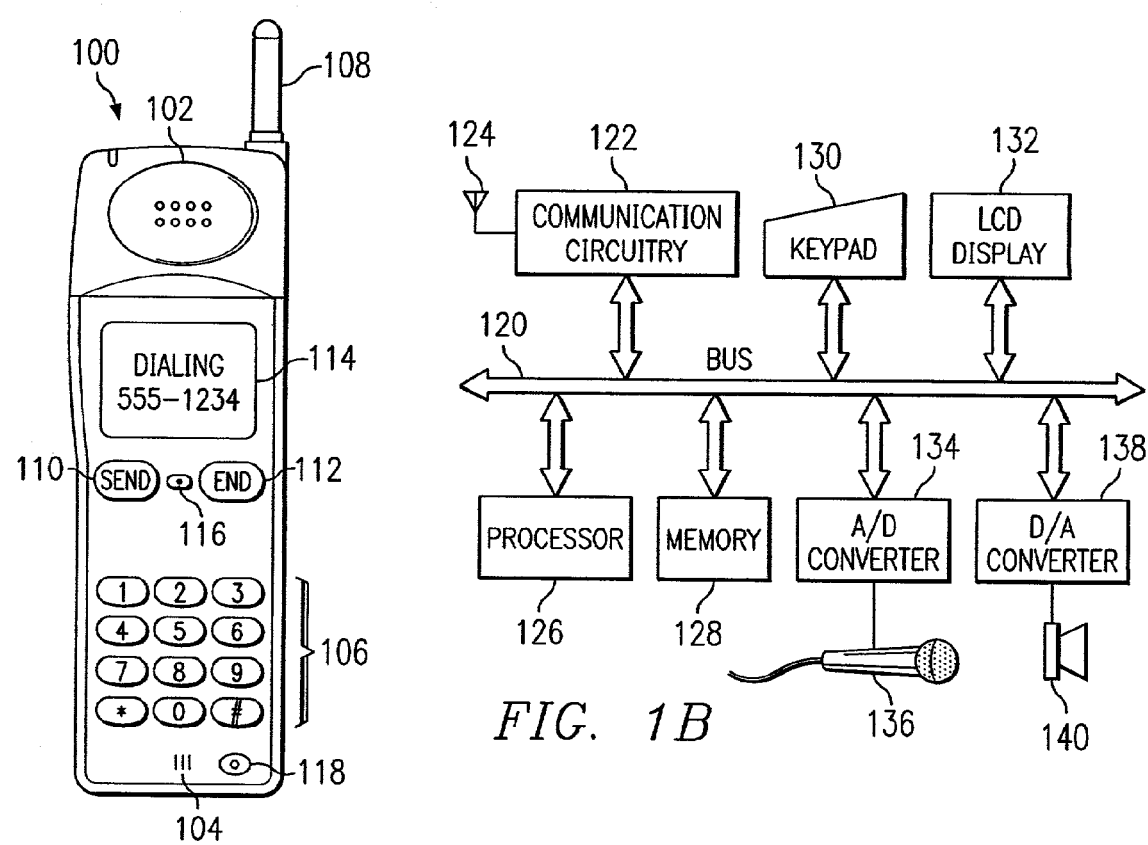
FIG. 1A
FIG. 1B
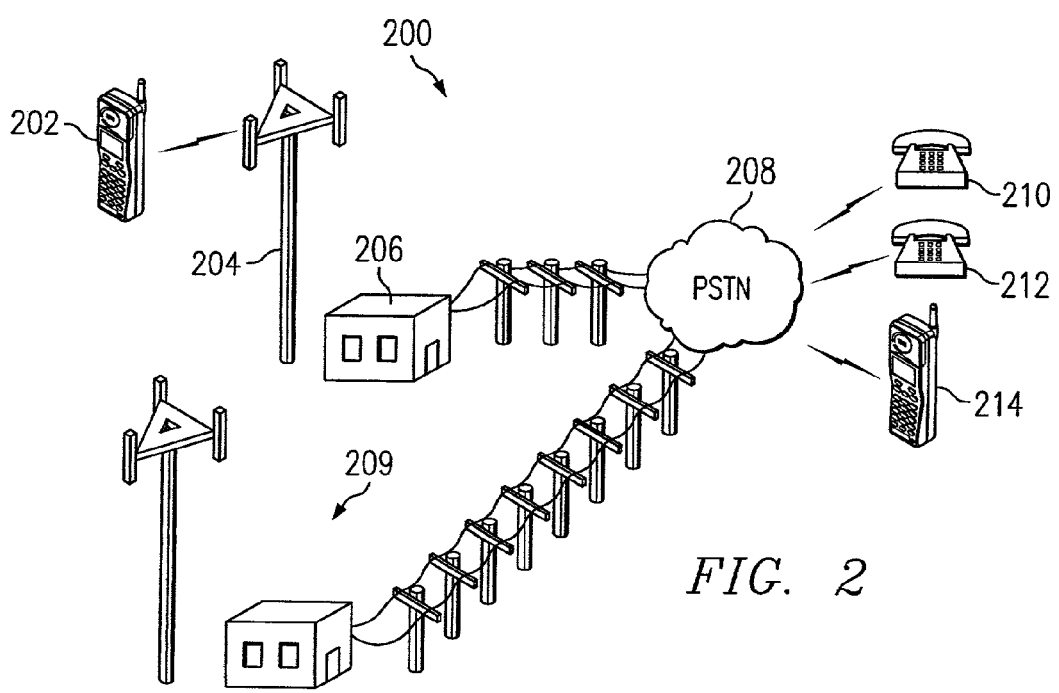
FIG. 2

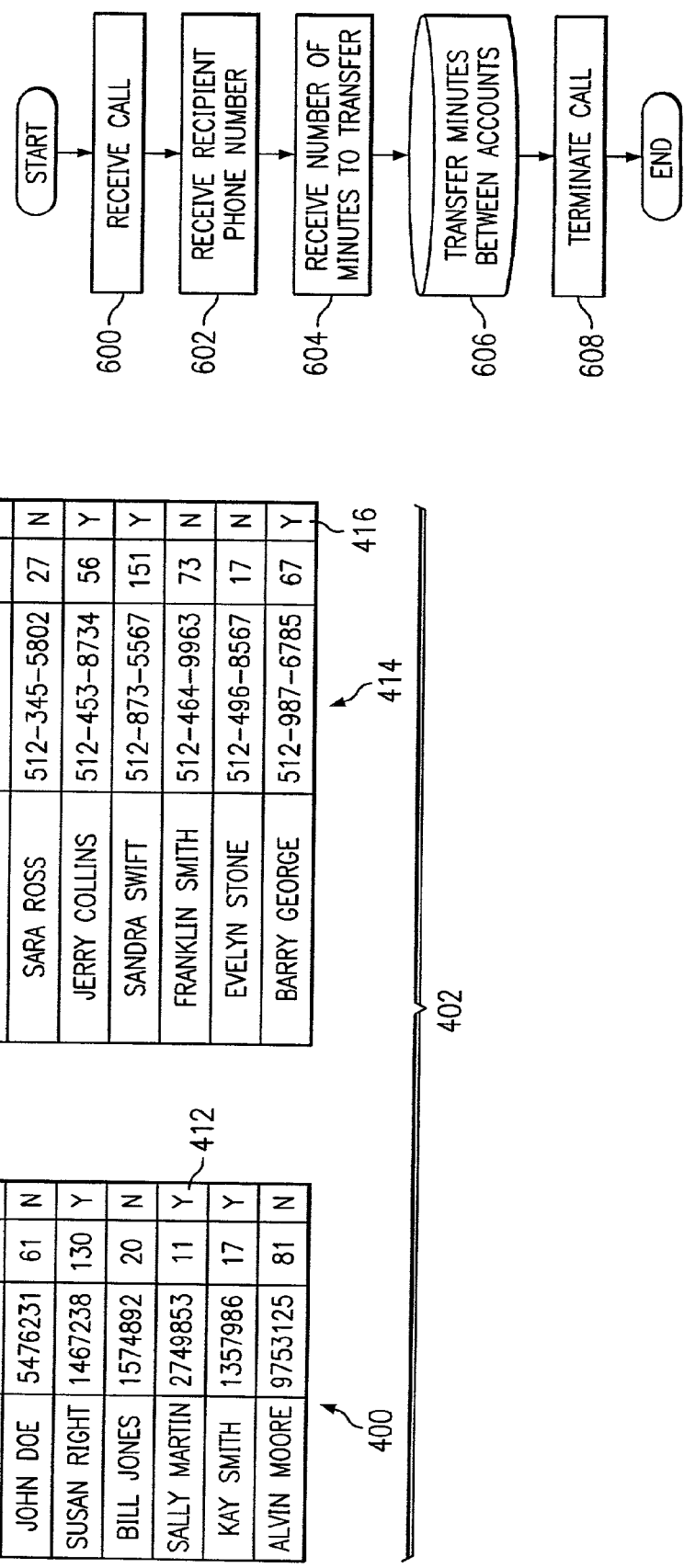

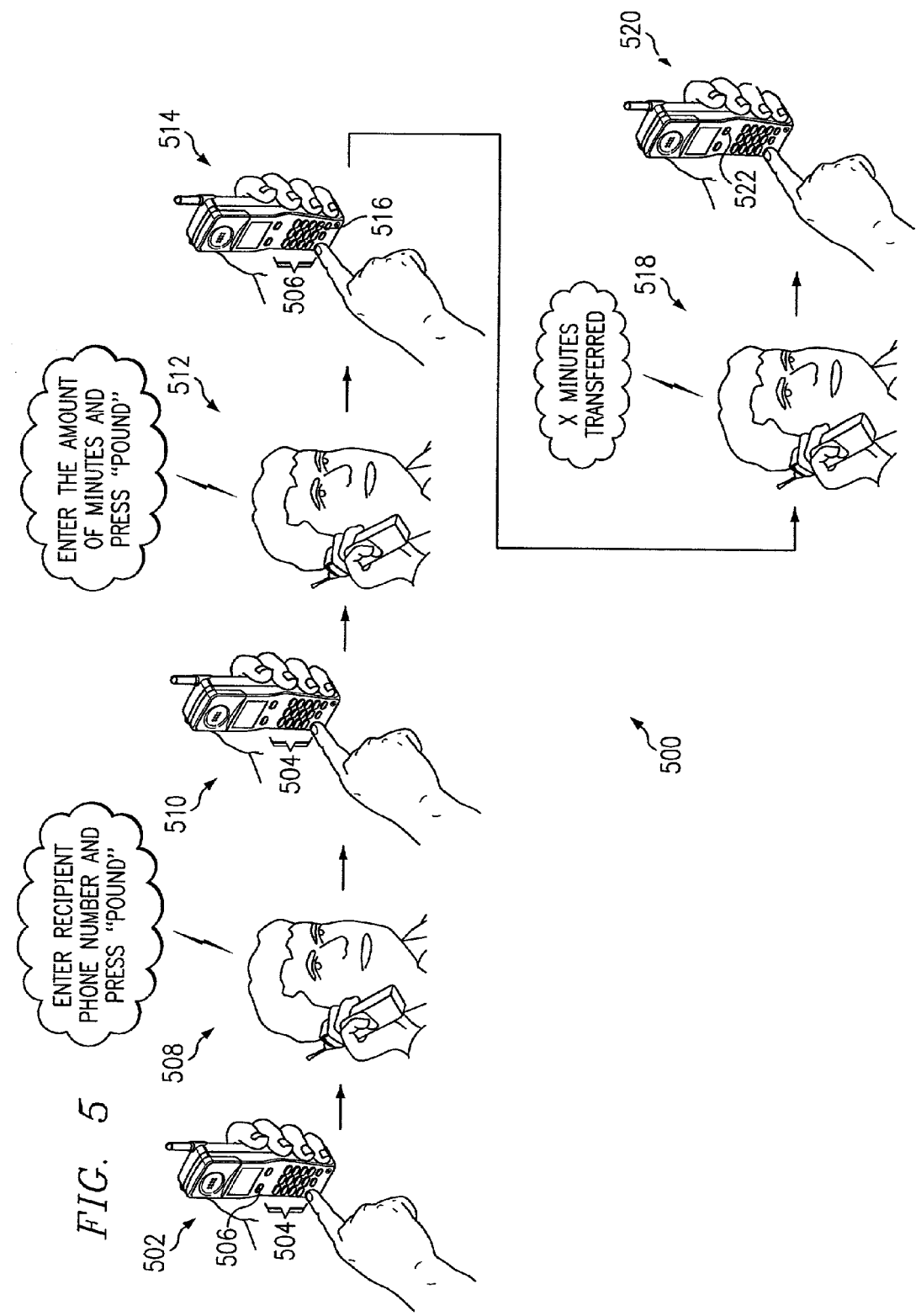

CALLER-INITIATED TRANSFER OF SERVICES BETWEEN TELEPHONES

BACKGROUND OF THE INVENTION

1. Technical Field

The present invention is directed generally toward administering a mobile telephone service. More specifically, the present invention is directed toward transferring services between mobile telephones 2. Description of Related Art The mobile telephone has ushered in a new era in interpersonal communications. While the late 1990s' widespread consumer interest in the Internet made ours a wired world, technical advances and increased consumer appeal are ushering in a new "wireless world." A number of mobile telephone manufacturers and service providers cater to a growing base of mobile telephone subscribers. Unlike most local telephone service in the United States, but akin to long-distance service, mobile telephone service is usually billed in minutes of airtime. That is, the amount a customer is charged is proportional to the amount of time spent in mobile telephone calls. For instance, a five minute call will usually cost five times as much as a one minute call. Unlike with long-distance service, however, airtime is generally billed to the customer regardless of whether the customer placed or received the call.

Because having every minute of every call charged for is a major discouragement to consumers wishing to use mobile telephones, mobile service providers generally employ a billing system in which customers pre-pay for a certain number of minutes of airtime each month. When a customer makes a call, the minutes of airtime are subtracted from the customer's balance of minutes for the month. Any additional minutes exceeding the customer's pre-paid balance are billed for separately. In most billing schemes, the current month's minutes expire at the end of the month if not used.

Thus, many mobile telephone customers pay for their telephone usage by redeeming pre-paid credits (measured in minutes of airtime). This scheme has many analogs in other areas of business. For instance, most individuals will mail a letter by first buying a pre-paid postage credit (i.e., a postage stamp), then redeeming the credit (i.e., mailing the letter with the stamp attached). Unlike postage stamps, currency, or other valuable units of exchange, under current mobile telephone billing systems, airtime minutes may not be transferred between customers. From an economic perspective, this can result in an inefficient use of resources. For instance, if a mobile telephone customer pays for 100 minutes of airtime as a part of the normal subscription plan, but the customer, for whatever reason, does not need that many minutes in a given month, the minutes (and the customer's money) will be wasted since the customer does not have a way to transfer those pre-paid minutes to someone who can use them before they expire.

Thus, there exists a need for an ability to transfer minutes from one customer's telephone account to another.

SUMMARY OF THE INVENTION

The present invention provides a method, computer program product, and data processing system for transferring mobile telephone minutes or other mobile telephone services or features from one customer to another. A customer dials into an interactive service that allows the customer to specify one or more recipients and a number of minutes, services, or features to transfer. A data processing system associated with the customer's mobile telephone service provider effects a transfer of minutes, services, or features from the customer's account to the recipients' accounts. In addition, a notification that the transfer has occurred can be sent to the recipients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is a diagram of a mobile telephone with which the processes of the present invention may be implemented;

FIG. 1B is a block diagram of a mobile telephone with which the processes of the present invention may be implemented;

FIG. 2 is a diagram of the operation of a mobile telephone system in which the present invention may be implemented;

FIG. 4 is a diagram of a database holding information about mobile telephone subscribers in a preferred embodiment of the present invention;

FIG. 5 is a diagram of a process of transferring mobile airtime minutes in accordance with a preferred embodiment of the present invention;

FIG. 6 is a flowchart representation of a process of transferring services between telephone customer accounts in accordance with a preferred embodiment of the present invention.

DETAILED DESCRIPTION OF THE PREFERRED EMBODIMENT

Figure 3:
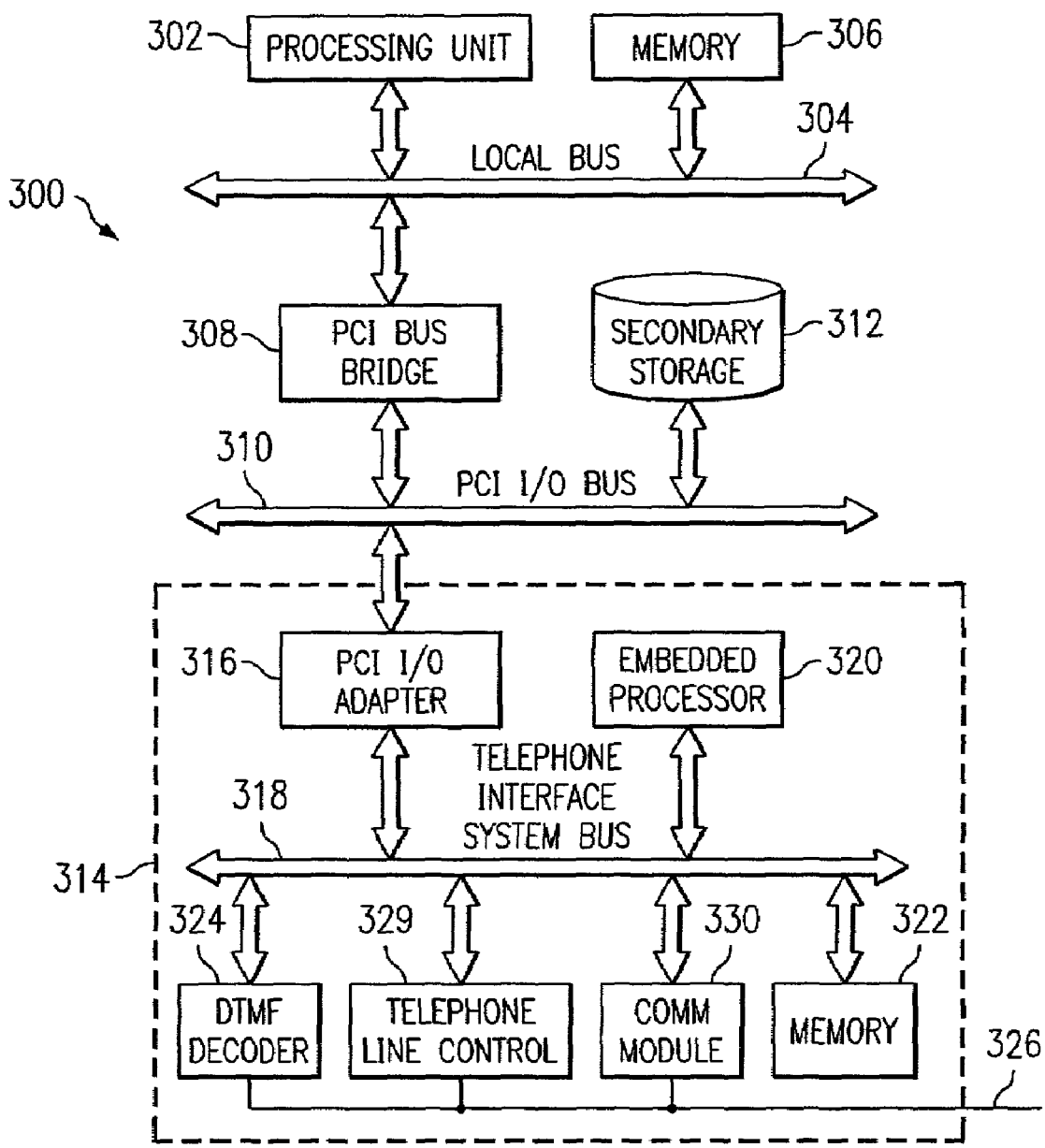
FIG. 3 is a block diagram of a data processing system in which the processes of the present invention may be executed.

FIG. 1 depicts an exemplary mobile telephone 100 with which the processes of the present invention can be implemented. Mobile telephone 100, for instance, could be a Talkabout® T8167 Mobile Telephone from Motorola, Inc. of Schaumberg, Ill. Like a conventional telephone, mobile telephone 100 contains an earpiece 102, a microphone 104, and a keypad 106 for emitting DTMF (Dual-Tone Multiple Frequency) tones for dialing. Mobile telephone 100, unlike a conventional telephone, uses an antenna 108 as its communications link to the Public Switched Telephone Network (PSTN), the standard public telephone network through which most telephone calls are routed. Mobile telephone 100 may transmit and receive data, including but not limited to voice data, through an analog-coded or digitally coded signal. One common communications standard for mobile telephones is the PCS (Personal Communications Services) standard, which uses digital signal coding. Some mobile telephones, such as dual-band mobile telephones, will allow multiple communications standards to be used with the same telephone; this is a convenience, particularly in remote areas where some communications protocols are not available.

Mobile telephone 100 includes a "send" button 110 and an "end" 112 button for initiating and terminating calls, respectively. To dial another telephone, a user enters the telephone number for that telephone on keypad 106 and presses "send"

button 110 to place the call. To "hang up" or terminate the call, the user presses "end" button 112.

Mobile telephone 100 also includes a liquid-crystal diode (LCD) display 114 for indicating to a user the status of mobile telephone 100, such as when mobile telephone 100 is dialing. In some mobile telephones, display 114 may be used for executing software, such as games, or for browsing World Wide Web documents loaded from the Internet through a wireless connection using antenna 108. A user of mobile telephone 100 will generally rely on a service provider to provide a wireless gateway into the PSTN. In addition to allowing a user to send and receive telephone calls, a service provider may provide additional features to customers. One of these features, as was already mentioned, is wireless Internet access. Another is voice mail. If the user of the mobile telephone 100 is unavailable (i.e., has turned off mobile telephone 100, is already talking to someone using mobile telephone 100, or simply ignores the ringing mobile telephone 100), a caller calling mobile telephone 100 can be switched into a voice mail service, where the caller can leave a message for the user of mobile telephone 100. An indicator, such as an envelope icon, can appear in display 114. The user of mobile telephone 100 can later access the voice mail service by pressing a special voice-mail button 116 or by calling a special telephone number (such as *123, for instance) or by calling the user's own number. The user can then use keypad 106 to enter DTMF tones to select recited voice mail menu options.

Mobile telephone 100 will generally run on some kind of battery power using a rechargeable battery pack, or the like. To conserve energy when mobile telephone 100 is not needed, power button 118 may be used to turn off and later turn on mobile telephone 100. When mobile telephone 100 is turned off, it cannot send or receive calls, although voice mail services are still available. FIG. 1B is a block diagram of mobile telephone 100. Bus 120 provides the central backbone through which the electronic components of mobile telephone 100 communicate.

Attached to bus 120 is a communications circuitry module 122, which transmits and receives mobile telephone signals through antenna 124 using one of a number of transmission and multiplexing schemes available for wireless communications including, but not limited to, FDMA (frequency division multiple access), TDMA (time division multiple access), CDMA (code division multiple access), and GSM (global system for mobile communications).

Communications circuitry module 122 and other components of mobile telephone 100 are controlled by processor 126 which may be a general-purpose microprocessor, such as a PowerPC microprocessor, or a digital signal processor or other specialized processor. Processor 126 executes program code stored in memory 128 to direct the operation of mobile telephone 100. Processor 126 also uses memory 128 to store data, such as frequently-dialed telephone numbers.

A variety of input-output (I/O) components communicate with processor 126 through bus 120, including keypad 130 and liquid-crystal display (LCD) 132. Analog-to-digital converter 134 takes analog audio information from microphone 136 and converts it to a digital data representation for transmission over bus 120. Likewise digital-to-analog converter 138 takes digital data from bus 120 and converts it into audio for presentation through earpiece speaker element 140.

All of these I/O components communicate with and are coordinated by processor 126. For example, digital audio data created by analog-to-digital converter 134 is retrieved by processor 126, prepared for transmission by processor 126, and then sent to communications circuitry module 122 for transmission over antenna 124. To take another example, a telephone number entered by a user using keypad 130 is retrieved by processor 126, which generates DTMF tones for transmission by communications circuitry module 122. Processor 126 then displays the entered telephone number on LCD display 132 to the user. FIG. 2 is a diagram depicting the operation of a mobile telephone 202 within a telephone system 200. Mobile telephone 202 communicates with radio tower 204, sending and receiving voice and other data, such as Internet data. Service provider facility 206 connects control tower 204 with Public Switched Telephone Network (PSTN) 208. Service provider facility 206 also performs such tasks as recording the number of minutes mobile telephone 202 stays connected on a call and providing voice mail and Internet services.

PSTN 208 connects service provider facility 206 with other communications devices such as telephones 210 and 212 and (by way of a service provider and radio tower) mobile telephone 214. One of ordinary skill in the art will recognize that many communications devices that are not telephones may be connected to PSTN 208 and thus accessible by mobile telephone 202.

One of ordinary skill in the art will also recognize that multiple service providers may be present within the same geographic area. In the diagram, service provider facility 209 represents an additional service provider in competition with the operators of service provider facility 206.

FIG. 3 is a block diagram of a data processing system 300 in which the processes and computer program product instructions of a preferred embodiment of the present invention may be implemented. Preferably data processing system 300 will be associated with equipment operated by a mobile telephone service provider. For example, data processing system 300 may be associated or located in service provider facility 206 in FIG. 2.

Data processing system 300 includes a (central) processing unit 302 connected to a local bus 304. Processing unit 302 executes instructions stored in memory 306, which is also connected to local bus 304. Processing unit 302 may comprise a single processor, such a microprocessor, or it may comprise multiple processors so as to allow the execution of multiple instructions simultaneously. Any number of processors could be used in processing unit 302. An example of a suitable processor is the PowerPC microprocessor, developed by IBM Corporation of Armonk, N.Y.

Many different types of memory are available and suitable for use within data processing system 300. Memory is generally classified as volatile and non-volatile memory. Volatile memory types store data temporarily while the data processing system is operating, but lose their data once the data processing system's power is turned off. Most volatile memory in use today is "random access memory," (RAM) meaning that data and instructions may be read from or written to any portion of the memory at any time. Common random access memory types well-known to those skilled in the art include static random access memory (SRAM) and dynamic random access memory (DRAM). Non-volatile memory types retain their information, even when the data processing system is turned off. Non-volatile memory types are generally referred to as "read-only memories" (ROM). Many types of non-volatile memories exist. Programmable read-only memory (PROM) may be programmed with permanent data using a PROM programming device. Erasable programmable read-only memory (EPROM) can be erased of its data contents, through such means as ultraviolet radiation or through electric current (as with an electricallyerasable PROM or EEPROM). Flash memory and non-volatile random-access memory (NVRAM) are two memory media that may be written to and erased within working circuits without the use of a memory programming device.

Memory 306 may store data to be operated upon by processing unit 302, it may store instructions to be executed by processing unit 302, or it may store both.

In FIG. 3, a single memory module is depicted, although many memory arrangements are possible. Cache memory, which is a high speed memory used for temporary storage of data and instructions to be stored to read from a primary bank of memory may be used. Also, certain systems designed with what is known as a "Harvard architecture" use separate memory and buses for data and instructions.

PCI bus bridge 308 connects local bus 304 to PCI input/output (I/O) bus 310. PCI I/O bus 310 is what is known as a backplane bus. A backplane bus is not connected directly to a central processing unit, but communicates with the central processing unit via a bus bridge. Peripheral devices, such as disk drives and other input/output and storage devices typically connect to backplane buses. Having a separate backplane bus prevents peripheral device malfunctions from interrupting the operation of the central processing unit (processing unit 302).

Secondary storage 312 is connected to PCI I/O bus 310. Secondary storage 312 may comprise one or more disk drives, magnetic tape drives, optical storage devices, or other persistent storage medium. Secondary storage 312 preferably stores relatively large amounts of data and instructions compared to memory 306. Secondary storage 312 may be used for permanent storage of data or instructions, such as a database, or secondary storage 312 may be used to supplement memory 306 with additional storage space. One common method of providing additional storage space to augment memory 306, called virtual memory, involves swapping portions of data, called pages, between memory 306 and secondary storage 312 such that pages are addressed and located in memory 306 when in use, but swapped out to secondary storage 312 when not in use.

Also connected to PCI I/O bus 310 is a telephone interface device 314. Telephone interface device 314 includes a PCI I/O adapter 316 connected to PCI I/O bus 310. PCI I/O adapter 316 allows telephone interface device 314 to communicate through PCI I/O bus 310. PCI I/O adapter 316 is connected to telephone interface system bus 318, which connects the various components of telephone interface device 314. An embedded processor 320 is preferably some sort of microprocessor, such as a Z80 microprocessor, manufactured by Zilog, Inc. Embedded processor 320 executes instructions stored in memory 322, which is also attached to telephone interface system bus 318. Embedded processor 320 interprets commands communicated through PCI I/O adapter 316 and, in response, directs the operation of telephone interface device 314. Embedded processor 320 operates on data, which it stores and retrieves in memory 322.

Alternatively, a microcontroller, such as an 8051 microcontroller, manufactured by Intel Corporation, could be used in place of embedded processor 320 and memory 322. A microcontroller is a monolithic integrated circuit containing both a processor unit and memory. Dual Tone Multiple Frequency (DTMF) decoder 324 interprets DTMF tones from telephone network line 326, translating the tones into corresponding numbers from a telephone keypad. DTMF decoders are available as monolithic integrated circuits from a number of vendors. DTMF decoder 324 reports the numeric interpretation of the DTMF tones to embedded processor 320 through telephone interface system bus 318.

Telephone network line 326 can be connected directly into the Public Switched Telephone Network, perhaps using a DSL (Digital Subscriber Line) modem. It may also be connected through a local-area network (LAN) using, for example, an RJ45 modular connector for an Ethernet LAN, perhaps connected to a T1 line (a high-bandwidth network line). Although a standard analog telephone line may be used, a more likely option would be utilize a digital telephone line instead.

Telephone line control system 329 acts under the control of embedded processor 320 to "pick up" or "hang up" telephone network line 326. Telephone line control system 329 also detects when telephone network line 326 is "ringing."

Embedded processor 320 transmits audio messages across telephone network line 326 by transmitting digital audio data (which may include voice, indicator chimes, DTMF signals, or any other audio signal) from memory 322 through communication module 330.

FIG. 4 is a diagram depicting the format of an account information database stored within secondary storage 312 of FIG. 3 in a preferred embodiment of the present invention. Table 400 includes entries 402 for each of the customers of a mobile telephone service provider. Account holder field 404 stores the name or identity of each customer. Account number field 406 stores an account number for each customer, which may be the customer's telephone number. Minute balance field 408 stores each customer's balance of remaining call minutes. The present invention provides a method, computer program product, and apparatus for transferring call minutes or other services from one customer's account to another. In a preferred embodiment, for instance, the customer whose entry is 410 can transfer call minutes from his balance of minutes to another customer, the customer whose entry is 412, for instance. The data processing system maintaining table 400 can effect the transfer by subtracting the number of transferred minutes from entry 410 and adding the minutes to entry 412.

Also, in a preferred embodiment, the mobile telephone customer whose entry is 410 may transfer minutes to another mobile telephone customer who is using a different telephone service provider (414) and whose entry is 416.

FIG. 5 provides a story board representation of a process of transferring call minutes from one customer's account to another's in a preferred embodiment of the present invention. In step 502, the customer transferring the minutes dials an telephone number or access code (such as *123) for the transfer function on keypad 504. Then the customer presses "Send" button 506 to initiate a call to the service. A call is connected to data processing system 300, as described in FIG. 3. In step 508, data processing system 300 answers the call and plays a recorded message through digital to analog converter 330, asking for the recipient's telephone number.

In step 510, the customer enters the recipient's telephone number and the "#" (pound) key on keypad 504, which causes DTMF tones to be produced and transmitted to data processing system 300. Data processing system 300 then decodes the DTMF tones to recover the entered digits. Next, in step 512, the customer is prompted to enter the number of minutes to transfer and press the "#" key. In step 514, the customer enters the number of minutes on keypad 504 and presses "#" key 516. In step 518, a response, reciting the number of minutes transferred is played. Finally, in step 520, the customer presses "End" key 522 to terminate the call.

FIG. 6 is a flowchart representation of a process for transferring minutes between customer accounts in a preferred embodiment of the present invention. First, a call to mobile phone service provider equipment is received (step 600). The recipient's telephone number is received (step 602). Then the number of minutes to be transferred is received (step 604). Customer records are updated to reflect the transfer of minutes between the accounts (step 606). Finally, the call is terminated (step 608).

One of ordinary skill in the art will recognize that a number of variations of the present invention exist. For instance, one particularly useful feature that could be added to the embodiment herein described would be a notification to the recipient that the recipient has received a certain number of minutes. The notification may be as simple as a pre-recorded message from the service provider sent via voice mail or as a courtesy call to the recipient. It may be a text message transmitted and displayed on display 114 (FIG. 1) or sent via electronic mail for example. Another possible option would be to allow the customer making the transfer to leave a voice mail message at the time of transfer. This would be particularly useful when the minutes transfer was a gift for a special occasion, for instance; the transferring customer could leave some kind of voice mail greeting wishing the recipient a happy birthday or some other gesture of goodwill.

Another variation, tied to the notification process would be to allow a recipient to accept or reject transfers. The recipient could respond to a text or voice mail notification by making a call to data processing system 300, for example, and selecting, through a series of prompts and responses, whether to accept or reject the transfer.

Yet another possible variation is to set up a periodic donation, where either a certain sum of minutes or, for instance, a customer's remaining balance of minutes at the end of a month are transferred to another recipient each month, or on some other periodic basis. This would particularly useful if a customer has remaining minutes at the end of a month that will expire; the customer could be allowed to preserve those minutes for someone else by giving them away.

Features or services other than call minutes could be transferred as well. For instance, if a customer has paid for enhanced telephone features the customer could transfer that service or feature to another customer for a certain period of time. For example, one customer could, as a gift, transfer a call-forwarding feature (allowing a customer to have all her calls forwarded to another telephone number) to another customer for a month.

Transfers of services need not be to only a single recipient. A transferring customer could name multiple recipients to receive the same service, feature, or number of minutes. As a convenience, a customer could be allowed to set up a distribution list, so that transfers made to the distribution list are shared among the member customers of the distribution list.

The transfer service need not be free of charge. Mobile telephone service providers could charge a transaction fee for performing a transfer. They could also offer the ability to make (free or for fee) transfers as a premium telephone service.

Another possible variation on the present invention is to allow transfers between customers having different mobile telephone service providers. Service providers enter into reciprocal agreements to allow transfers to and from different service providers. Service providers agree to exchange rates, wherein certain services or features from one service provider would have a relative value vis-à-vis services or features from another service provider. For example, two service providers (A and B) may agree to allow transfers of minutes between the two service providers with an exchange rate of 3 minutes of A for every 2 minutes of B. Accordingly, a customer of B could transfer 100 minutes of his calling time to a customer of A. The customer of A would receive 150 minutes of calling time, due to the exchange rate agreement between A and B.

From a technical standpoint, transfers between service providers could be facilitated by having the data processing systems of one service provider connected in a network, such as the Internet or the PSTN, along with the data processing systems of the other service provider. Transfers from one service provider to another would then involve transmitting an instruction across the network from one service provider to another service provider to update customer account records.

Although the preferred embodiment involves mobile telephone accounts, the present invention is not strictly limited to use with mobile telephones. Another variation on the present invention is to allow transfer of services between non-mobile telephone service provider accounts. For instance, a user of a pre-paid calling card transfers minutes from her calling card account to that of another customer. Likewise, a user of conventional telephone service transfers a service, such as call waiting (where a customer that is on the phone can still receive calls from others), or local or long-distance minutes to another customer.

The invention is not limited to use with traditional telephones or mobile telephones, either. New hybrid devices, such as telephone-PDA (personal digital assistant) combinations are becoming more prevalent. These devices could be used in the present invention, as well.

The present invention is also not limited to an audio or touchtone interface. Speech recognition technology is available that would make it possible for a user to speak his or her selections, rather than entering them using a touch-tone keypad.

Visual interfaces using the LCD screen of a telephone or telephone-PDA combination could also be used for entering user selections. For instance, a user could select a number of minutes to transfer from a menu of choices (e.g., 15 minutes, 30 minutes, 45 minutes, etc.) on the LCD of the user's telephone-PDA.

Figure 7:
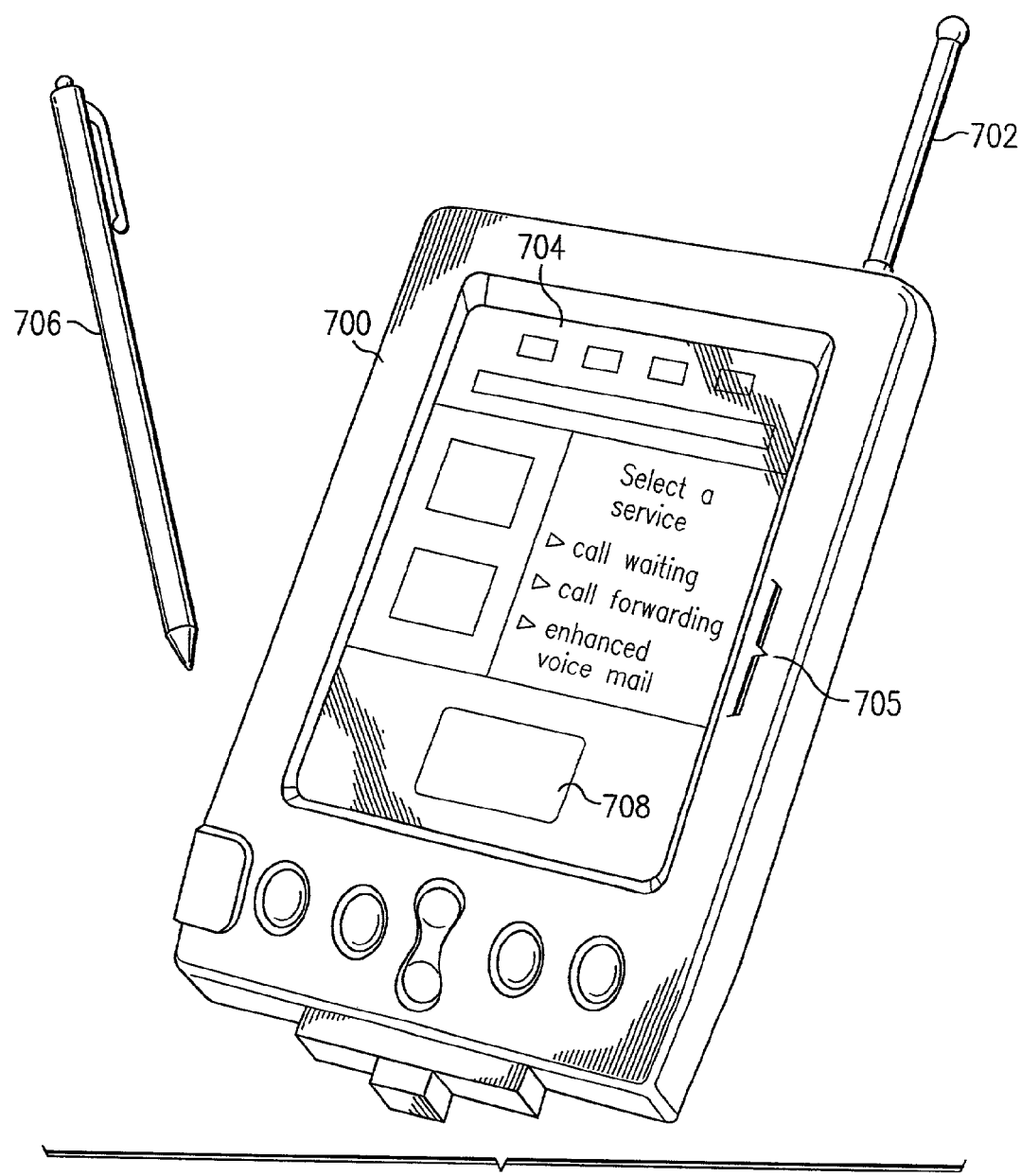
FIG. 7 depicts a telephone-PDA combination utilizing a menu-based interface as used in a preferred embodiment of the present invention.

FIG. 7 depicts a telephone-PDA combination 800 utilizing a menu-based interface. Telephone-PDA combination 700 uses antenna 702 to transmit and receive audio and other data. A receiver microphone and earpiece are not shown as they are located on the reverse side of telephone-PDA combination 700.

Touch-sensitive screen 704 displays menu options 705 that are available to the user. The user may choose an option by touching the desired one of options 705 with stylus 706. In an alternative embodiment, the particular service or amount of minutes to be transferred could be entered by "writing" the appropriate service or amount of minutes on writing interface surface 708 using stylus 706.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   receiving identifying information for at least one recipient telephone customer account;
   receiving an indication of a feature to be transferred from a transferring telephone customer account to the at least one recipient telephone customer account;
   transferring the feature from the transferring telephone customer account to the at least one recipient telephone customer account based on an exchange rate, wherein the feature includes at least one of a call waiting, call forwarding, enhanced voice mail service, and a number of call minutes, and wherein the exchange rate specifies a first value for the feature in the at least one recipient telephone customer account and a second value for the feature in the transferring telephone customer account, and wherein a value difference between the first value and the second value is applied to the at least one recipient telephone customer account.

2. The method of claim 1, wherein the step of receiving the indication of the feature includes a step of:
   receiving the indication of the feature as a menu choice.

3. The method of claim 1, wherein the identifying information includes a distribution list corresponding to accounts from the at least one recipient telephone customer account, and wherein the distribution list allows for a shared transfer of a same feature among accounts corresponding to the distribution list.

4. The method of claim 1, wherein the identifying information includes a telephone number.

5. The method of claim 4, wherein the telephone number corresponds to a mobile telephone.

6. The method of claim 1, wherein the number of call minutes are transferred on a periodic basis.

7. The method of claim 1, wherein the number of call minutes include mobile airtime minutes.

8. The method of claim 1, wherein the number of call minutes include long distance minutes.

9. The method of claim 1, further comprising:
   sending a notification to the at least one recipient telephone customer account.

10. The method of claim 1, further comprising:
    receiving one of an acceptance and a rejection from the at least one recipient telephone customer account.

11. The method of claim 1, wherein the transferring telephone customer account is associated with a first telephone service provider and the at least one recipient telephone customer account includes a telephone customer account that is associated with a second telephone service provider, and wherein the first telephone service provider has an exchange rate agreement with the second telephone service provider to allow transfer of the feature.

12. A computer program product in a computer-readable medium comprising instructions for:
    receiving identifying information for at least one recipient telephone customer account;
    receiving an indication of a feature to be transferred from a transferring telephone customer account to the at least one recipient telephone customer account;
    transferring the feature from the transferring telephone customer account to the at least one recipient telephone customer account based on an exchange rate, wherein the feature includes at least one of a call waiting, call forwarding, enhanced voice mail service, and a number of call minutes, and wherein the exchange rate specifies a first value for the feature in the at least one recipient telephone customer account and a second value for the feature in the transferring telephone customer account, and wherein a value difference between the first value and the second value is applied to the at least one recipient telephone customer account.

13. The computer program product of claim 12, wherein the instructions for receiving the indication of the feature include instructions for:
    receiving the indication of the feature as a menu choice.

14. The computer program product of claim 12, wherein the identifying information includes a distribution list corresponding to accounts from the at least one recipient telephone customer account, and wherein the distribution list allows for a shared transfer of a same feature among accounts corresponding to the distribution list.

15. The computer program product of claim 12, wherein the identifying information includes a telephone number.

16. The computer program product of claim 15, wherein the telephone number corresponds to a mobile telephone.

17. The computer program product of claim 12, wherein the number of call minutes are transferred on a periodic basis.

18. The computer program product of claim 12, wherein the number of call minutes include mobile airtime minutes.

19. The computer program product of claim 12, wherein the number of call minutes include long distance minutes.

20. The computer program product of claim 12, comprising additional instructions for:
    sending a notification to the at least one recipient telephone customer account.

21. The computer program product of claim 12, comprising additional instructions for:
    receiving one of an acceptance and a rejection from the at least one recipient telephone customer account.

22. The computer program product of claim 12, wherein the transferring telephone customer account is associated with a first telephone service provider and the at least one recipient telephone customer account includes a telephone customer account that is associated with a second telephone service provider, and wherein the first telephone service provider has an exchange rate agreement with the second telephone service provider to allow transfer of the feature.

23. A data processing system comprising:
    a bus system;
    a processing unit including at least one processor; and
    a memory containing a set of instructions,
    wherein the processing unit executes the set of instructions to perform the acts of:
    receiving identifying information for at least one recipient telephone customer account;
    receiving an indication of a feature to be transferred from a transferring telephone customer account to the at least one recipient telephone customer account;

transferring the feature from the transferring telephone customer account to the at least one recipient telephone customer account based on an exchange rate, wherein the feature includes at least one of a call waiting, call forwarding, enhanced voice mail service, and a number of call minutes, and wherein the exchange rate specifies a first value for the feature in the at least one recipient telephone customer account and a second value for the feature in the transferring telephone customer account, and wherein a value difference between the first value and the second value is applied to the at least one recipient telephone customer account.

24. The data processing system of claim 23, wherein the act of receiving the indication of the feature includes the act of:
   receiving the indication of the feature as a menu choice.

25. The data processing system of claim 23, wherein the identifying information includes a distribution list corresponding to accounts from the at least one recipient telephone customer account, and wherein the distribution list allows for a shared transfer of a same feature among accounts corresponding to the distribution list.

26. The data processing system of claim 23, wherein the identifying information includes a telephone number.

27. The data processing system of claim 26, wherein the telephone number corresponds to a mobile telephone.

28. The data processing system of claim 23, wherein the number of call minutes are transferred on a periodic basis.

29. The data processing system of claim 23, wherein the number of call minutes include mobile airtime minutes.

30. The data processing system of claim 23, wherein the number at call minutes include long distance minutes.

31. The data processing system of claim 23, wherein the processing unit executes the set of instructions to perform the additional acts of:
   sending a notification to the at least one recipient telephone customer account.

32. The data processing system of claim 23, wherein the processing unit executes the set of instructions to perform the additional act of:
   receiving one of an acceptance and a rejection from the at least one recipient telephone customer account.

33. The data processing system of claim 23, wherein the transferring telephone customer account is associated wit a first telephone service provider and the at least one recipient telephone customer account includes a telephone customer account that is associated with a second telephone service provider, and wherein the first telephone service provider has an exchange rate agreement with the second telephone service provider to allow transfer of the feature.

* * * * *